(12) United States Patent
Tseng

(10) Patent No.: US 8,271,843 B2
(45) Date of Patent: *Sep. 18, 2012

(54) METHOD AND APPARATUS FOR IMPROVING HYBRID AUTOMATIC REPEAT REQUEST OPERATION IN A WIRELESS COMMUNICATIONS SYSTEM

(75) Inventor: Li-Chih Tseng, Taipei (TW)

(73) Assignee: Innovative Sonic Limited, Port Louis (MU)

(*) Notice: Subject to any disclaimer, the term of this patent is extended or adjusted under 35 U.S.C. 154(b) by 1068 days.

This patent is subject to a terminal disclaimer.

(21) Appl. No.: 12/173,826

(22) Filed: Jul. 16, 2008

(65) Prior Publication Data

US 2009/0024896 A1 Jan. 22, 2009

Related U.S. Application Data

(60) Provisional application No. 60/950,106, filed on Jul. 16, 2007.

(51) Int. Cl.
*G08C 25/02* (2006.01)
*H04L 1/18* (2006.01)
*H04L 1/14* (2006.01)
*H03M 13/00* (2006.01)

(52) U.S. Cl. .......... 714/748; 714/749; 714/751

(58) Field of Classification Search .......... 714/748, 714/749, 751
See application file for complete search history.

(56) References Cited

U.S. PATENT DOCUMENTS

| | | | |
|---|---|---|---|
| 6,741,581 B1 | 5/2004 | Sun | |
| 6,901,063 B2 * | 5/2005 | Vayanos et al. | 370/335 |
| 7,283,508 B2 * | 10/2007 | Choi et al. | 370/341 |
| 7,286,540 B2 * | 10/2007 | Kim et al. | 370/394 |
| 7,321,589 B2 * | 1/2008 | Lohr et al. | 370/394 |
| 7,346,035 B2 * | 3/2008 | Lee et al. | 370/331 |
| 7,391,727 B2 * | 6/2008 | Yoon et al. | 370/232 |
| 7,471,693 B2 * | 12/2008 | Petrovic et al. | 370/444 |
| 7,484,000 B2 * | 1/2009 | Jiang | 709/240 |
| 7,509,554 B2 * | 3/2009 | Lohr et al. | 714/748 |
| 7,631,247 B2 * | 12/2009 | Petrovic et al. | 714/776 |

(Continued)

FOREIGN PATENT DOCUMENTS

EP  1 496 639 A2  1/2005

(Continued)

OTHER PUBLICATIONS

3GPP TS 25.308 V7.1.0 Technical Specification (Dec. 2006).*

(Continued)

*Primary Examiner* — Joseph D Torres
(74) *Attorney, Agent, or Firm* — Blue Capital Law Firm, P.C.

(57) ABSTRACT

A method of improving Hybrid Automatic Repeat Request operation for a user equipment operating in HS-SCCH less operation in a wireless communications system includes receiving a retransmission data in an HARQ procedure, determining a decoding result of data stored in a first soft buffer, combining the retransmission data with the data stored in the first soft buffer for generating a combined data when the UE determines that the data stored in the first soft buffer has not been successfully decoded, and performing a decoding process on the combined data and a store process corresponding to a second soft buffer. The first soft buffer is obtained by a first rule and the second soft buffer is obtained by a second rule.

12 Claims, 4 Drawing Sheets

U.S. PATENT DOCUMENTS

| | | | |
|---|---|---|---|
| 7,646,742 B2* | 1/2010 | Petrovic et al. | 370/328 |
| 7,657,815 B2* | 2/2010 | Seidel et al. | 714/748 |
| 7,715,311 B2* | 5/2010 | Herrmann | 370/227 |
| 7,764,661 B2* | 7/2010 | Heo et al. | 370/342 |
| 7,783,949 B2* | 8/2010 | Lohr et al. | 714/751 |
| 7,818,647 B2* | 10/2010 | Lohr et al. | 714/750 |
| 7,860,052 B2* | 12/2010 | Lohr et al. | 370/329 |
| 7,894,444 B2* | 2/2011 | Lohr et al. | 370/394 |
| 7,899,011 B2* | 3/2011 | Petrovic et al. | 370/329 |
| 7,921,348 B2* | 4/2011 | Seidel et al. | 714/751 |
| 7,948,936 B2* | 5/2011 | Lohr et al. | 370/329 |
| 7,979,770 B2* | 7/2011 | Lohr et al. | 714/751 |
| 2002/0159410 A1* | 10/2002 | Odenwalder et al. | 370/329 |
| 2003/0210669 A1 | 11/2003 | Vayanos | |
| 2004/0148552 A1 | 7/2004 | Matsumoto | |
| 2006/0064625 A1 | 3/2006 | Klein | |
| 2006/0293055 A1 | 12/2006 | Pirskanen | |
| 2010/0023835 A1* | 1/2010 | Tseng | 714/751 |

FOREIGN PATENT DOCUMENTS

| | | |
|---|---|---|
| EP | 1496639 A2 | 12/2005 |
| EP | 1 496 639 A3 | 7/2007 |
| JP | 2002135233 A | 5/2002 |
| JP | 2003273844 A | 9/2003 |
| JP | 2005525745 A | 8/2005 |
| JP | 2008228310 A | 9/2008 |
| JP | 2008537379 A | 9/2008 |
| JP | 2009219111 A | 9/2009 |
| KR | 20020019334 | 3/2002 |
| KR | 1020050091581 A | 9/2005 |
| KR | 1020050109411 A | 11/2005 |
| KR | 1020060016292 A | 2/2006 |
| KR | 1020060025231 A | 3/2006 |
| KR | 1020060031862 A | 4/2006 |
| KR | 100648067 B1 | 11/2006 |
| KR | 1020070024302 A | 3/2007 |
| WO | 2006071831 A2 | 7/2006 |
| WO | 2006071831 A3 | 7/2006 |
| WO | 2006100597 A1 | 9/2006 |
| WO | 2007052719 A1 | 5/2007 |

OTHER PUBLICATIONS

Notice of Allowance on corresponding foreign application (KR Application No. 10-2008-55830) from the Korean Intellectual Property Office dated Sep. 30, 2010.

Office Action on corresponding foreign application (JP2008-151123) from the Japan Patent Office dated Nov. 9, 2010.

Notice of Allowance on corresponding foreign application (KR Application No. 10-2008-55831) from the Korean Intellectual Property Office dated Nov. 29, 2010.

3GPP TS 25.331 V7.4.0, 3GPP, Mar. 2007, p. 319,320,348,405,406,591,592,638,662.

"Universal Mobile Telecommunications System (UMTS); Radio Resource Control (RRC); Protocol specification (3GPP TS 25.331 version 7.5.0 Release 7)", ETSI TS 125 331 V7.5.0 (Jun. 2007), p. 41, p. 295, p. 371, p. 476-479, p. 684, p. 1199, ISSN: 0000-0001, ETSI Standards, LIS, Sophia Antipolis Cedex, France, XP014040019.

QUALCOMM Europe: "Impact of MIMO on RAN2 Specifications" 3GPP TSG-RAN WG2 meeting #56-bis, R2-070194, pp. 1-4, Jan. 15-19, 2007, XP002482050.

QUALCOMM Europe: "Proposed CR to TS 25.331 [Rel-7] on introducing MIMO in RRC specification" 3GPP TSG-RAN2 Meeting #56bis, R2-070241, pp. 1-22, Jan. 15-19, 2007, XP002482051.

QUALCOMM Europe, Nokia, Ericsson, Philips, Alcatel-Lucent: "Introduction of DTX-DRX and HS-SCCH less in MAC", 3GPP TSG-RAN WG2 Meeting #56-bis, R2-070346, Jan. 15-19, 2007, XP050133427, Sorrento, Italy.

3GPP TS 25.331 (Mar. 2007), p. 401-404, 442-444.

Office Action on corresponding foreign application (JP2008-151123) from the Japan Patent Office dated Mar. 1, 2011.

R2-072258 3GPP TSG-RAN WG2 Meeting #58, "Introduction of Improved L2 support for high data rates and Enhanced CELL_FACH state", May 2007.

Method and Apparatus for Improving the Performance of High Order Modulation and MIMO in HSPA.

Method and Apparatus for allocating HARQ configuration and concatenation and delivery of MAC PDUs.

Method and Apparatus for Reordering Packet and Handling RRC Reconfiguration.

Method and Apparatus for Improving UE Waiting and DRX Operation in a Wireless Communication System.

Method and Apparatus for improving continuous packet connectivity (CPC).

R2-073811 3GPP TSG-RAN WG2 Meeting #59, "Clarification on the HARQ procedure for HS-SCCH less operation", Aug. 2007.

3GPP TSG-RAN WG2 Meeting #58, Kobe, Japan, May 7-11, 2007 (R2-072262).

3GPP TSG-RAN WG2 Meeting #58, Kobe, Japan, May 7-11, 2007 (R2-072305).

Office Action on related foreign application (JP2008-153381) from the Japan Patent Office dated Dec. 14, 2010.

3GPP TS 25.321 V7.4.0 (Mar. 2007), p. 85-86.

Office Action on corresponding foreign application (JP2008-163026) from the Japan Patent Office dated Jun. 28, 2011.

Nokia, NSN : "Introduction two DRX schemes in URA_PCH and CELL_PCH", 3GPP TSG-RAN WG2 Meeting #58, R2-072262, May 7-11, 2007, XP002551196.

Nokia, NSN: "Introduction of HS-DSCH reception in CELL_FACH, URA_PCH and CELL_PCH" 3GPP TSG-WG2 Meeting #58, R2-072305, May 7-11, 2007, XP002551691.

* cited by examiner

METHOD AND APPARATUS FOR IMPROVING HYBRID AUTOMATIC REPEAT REQUEST OPERATION IN A WIRELESS COMMUNICATIONS SYSTEM

CROSS REFERENCE TO RELATED APPLICATIONS

This application claims the benefit of U.S. Provisional Application No. 60/950,106, filed on Jul. 16, 2007 and entitled "Method and Apparatus for Improving HARQ Operations in the transition of MIMO mode and non-MIMO mode and in HS-SCCH Less Operation", the contents of which are incorporated herein by reference.

BACKGROUND OF THE INVENTION

1. Field of the Invention

The present invention relates to a method and related apparatus for improving Hybrid Automatic Repeat Request (HARQ) operation for a user equipment in a wireless communications system, and more particularly, to a method and related apparatus for deciding whether retransmission data is combined with data of a previous transmission according to a decoding result of the data of the previous transmission, for enhancing transmission efficiency of the HARQ operation.

2. Description of the Prior Art

The third generation (3G) mobile telecommunications system, the Universal Mobile Telecommunications System (UMTS), has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS (Quality of Service) requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate.

For HSDPA and HSUPA, the 3rd Generation Partnership Project (3GPP) provides a Continuous Packet Connectivity (CPC) protocol specification, which includes features that, for user equipments (UEs) in CELL_DCH state, aim to significantly increase the number of packet data users for a cell, reduce the uplink noise rise and improve achievable download capacity for VoIP. For an HSDPA UE, the UE can work in a special mode, HS-SCCH less operation, included in CPC, for reducing the loading on high speed shared control channel (HS-SCCH). In addition, HSDPA and HSUPA adopt Hybrid Automatic Repeat Request (HARQ) technology to enhance retransmission rate and reduce transmission delay. HARQ is a technology combining Feed-forward Error Correction (FEC) and ARQ methods, which makes a Universal Terrestrial Radio Access Network (UTRAN) trigger retransmission according to positive/negative acknowledgement signals (ACK/NAK) transmitted from the UE, and the UE stores useful information about the last failed transmission for later use.

In the HS-SCCH less operation, the HS-SCCH is not transmitted with the first HARQ transmission. In this situation, the UE receives a high speed physical downlink shared channel (HS-PDSCH) according to predefined control information received when the HS-SCCH less operation is enabled, for reducing HS-SCCH overhead. Note that, in the HS-SCCH less operation, the same data is limited to 3 transmissions at most; in other words, the HARQ procedure is limited to 2 retransmissions. The UTRAN has to transmit corresponding control information for retransmissions on the HS-SCCH so that the UE receives the HS-PDSCH according to the corresponding control information.

For a detailed HARQ procedure for the HS-SCCH less operation, please refer to the associated 3GPP communications protocol specification. When the UE receives the data of the first transmission, the UE places the data of the first transmission in a soft buffer, replacing any data previously stored in the soft buffer. Next, the UE decodes the data in the soft buffer according to the predefined control information received when the HS-SCCH less operation is enabled. If the data has been decoded successfully, the UE reports a positive acknowledgement (ACK) to the base station, also known as Node-B, and waits for a new transmission. If the data has not been successfully decoded, the UE does not report a negative acknowledgement (NAK) to the Node-B and just waits for the second transmission, also called the first retransmission. During the second and the third transmissions, the control information, such as "second or third transmission" and "pointer to the previous transmission", are transmitted on the HS-SCCH.

Next, for the second transmission, the UE receives the data of the first transmission in the soft buffer according to the received control information, "second or third transmission" and "pointer to the previous transmission", and combines the data of the first transmission with the data of the second transmission for generating a first combined data. Then, the UE decodes the first combined data according to the corresponding control information received in the second transmission. If the first combined data has been decoded successfully, the UE reports an ACK to the Node-B and waits for a new transmission. Otherwise, the UE stores the first combined data in a soft buffer, reports a NAK to the Node-B and waits for the third transmission. The process of the third transmission is identical to the process of the second transmission and is not given here.

From the above, it is known that when the Node-B does not receive an ACK corresponding to the first transmission, the Node-B will start the second transmission. Or, when the Node-B receives a NAK corresponding to the second transmission, the Node-B will start the third transmission. Even if the UE decodes the data of the first transmission or the data of the second transmission successfully and reports a corresponding ACK, the Node-B may not receive the ACK or may decode the ACK as a NAK due to poor communication quality in the environment, and thereby starts a retransmission. On the other hand, the UE decodes the retransmission data after combining the retransmission data with the data previously stored in the soft buffer. In this situation, even if the UE decodes the data of the first transmission or the data of the second transmission successfully, the UE still has to combine retransmission data with the data that has been decoded successfully. Therefore, the data combination is unnecessary and reduces transmission efficiency.

In conclusion, when the UE has sent an ACK but the Node-B does not receive the ACK or decodes the ACK as a NAK, the UE still has to combine retransmission data with the data that has been decoded successfully. As a result, transmission efficiency of the HARQ operation is reduced for the UE in the HS-SCCH operation.

SUMMARY OF THE INVENTION

The present invention provides a method and related apparatus for improving HARQ operation for a UE in a wireless communications system.

The present invention discloses a method of improving HARQ operation for a UE operating in HS-SCCH less operation in a wireless communications system. The method includes receiving a retransmission data in an HARQ procedure, determining a decoding result of data stored in a first soft buffer, combining the retransmission data with the data stored in the first soft buffer for generating a combined data when the UE determines that the data stored in the first soft buffer has not been successfully decoded, and performing a decoding process on the combined data and a store process corresponding to a second soft buffer, wherein the first soft buffer is obtained by a first rule and the second soft buffer is obtained by a second rule.

The present invention further discloses a communications device operating in HS-SCCH less operation of a wireless communications system for improving HARQ operation. The communications device includes a control circuit for realizing functions of the communications device, a central processing unit installed in the control circuit for executing a program code to operate the control circuit, and a memory coupled to the central processing unit for storing the program code. The program code includes receiving a retransmission data in an HARQ procedure, determining a decoding result of data stored in a first soft buffer, combining the retransmission data with the data stored in the first soft buffer for generating a combined data when the communications device determines that the data stored in the first soft buffer has not been successfully decoded, and performing a decoding process on the combined data and a store process corresponding to a second soft buffer, wherein the first soft buffer is obtained by a first rule and the second soft buffer is obtained by a second rule.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
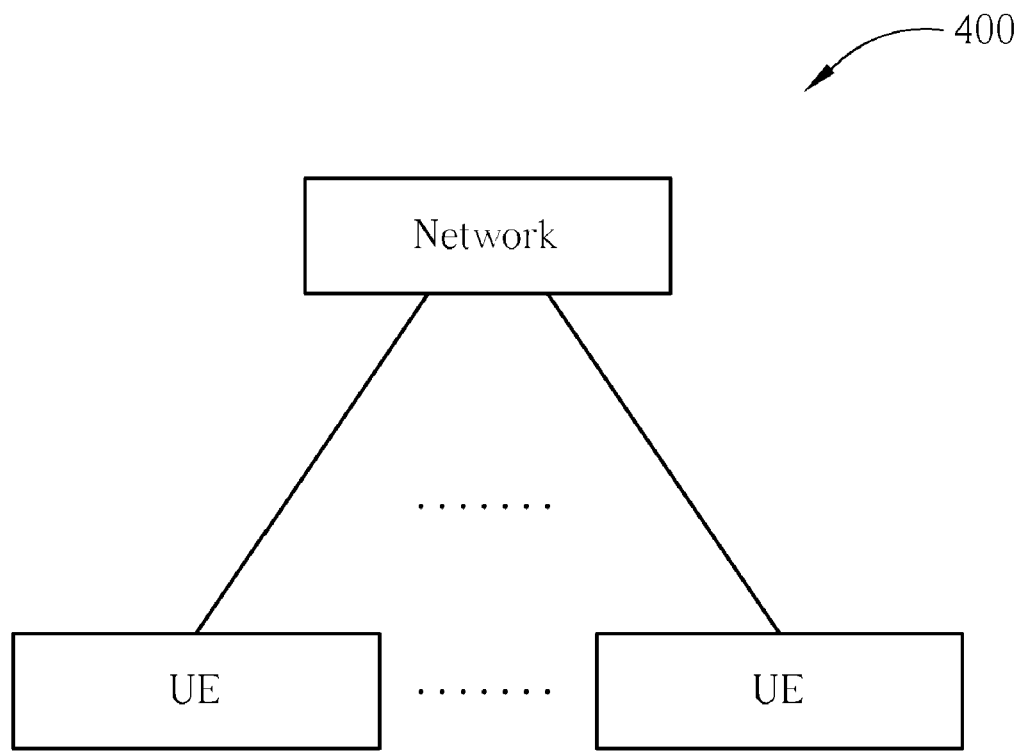
FIG. 4 is a schematic diagram of a communications system.

Please refer to FIG. 4, which is a schematic diagram of a wireless communications system 400. The wireless communications system 400 is preferably a High Speed Package Access (HSPA) system, and is briefly composed of a network and a plurality of user equipments (UEs). In FIG. 4, the network and the UEs are simply utilized for illustrating the structure of the wireless communications system 400. Practically, the network may comprise a plurality of base stations (or Node B), radio network controllers and so on according to actual demands, and the UEs can be devices such as mobile phones, computer systems, etc.

Figure 1:
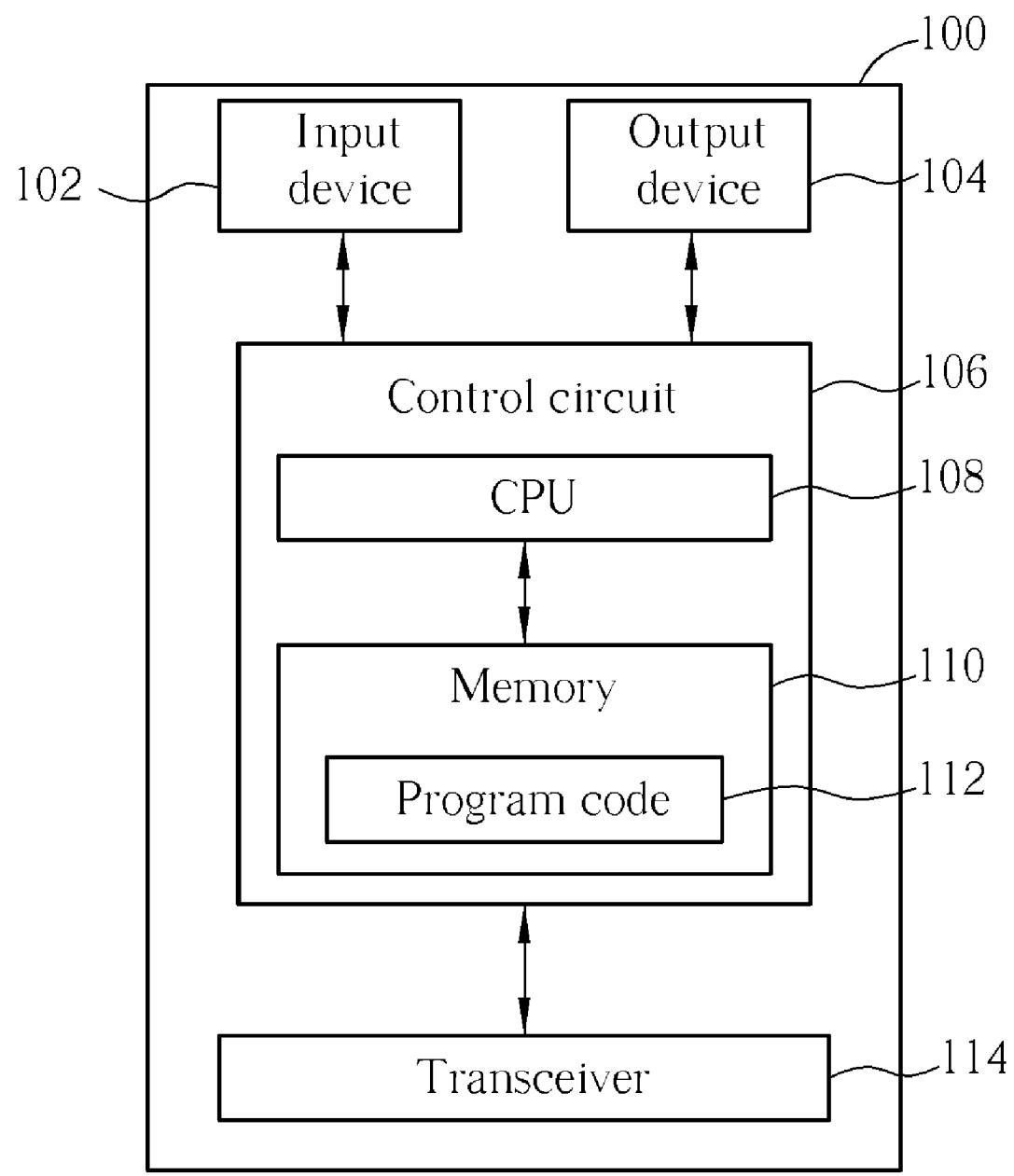
FIG. 1 is a functional block diagram of a communications device.

Please refer to FIG. 1, which is a functional block diagram of a communications device 100. The communications device 100 can be used for implementing a UE shown in FIG. 4. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, deliver received signals to the control circuit 106, and output signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
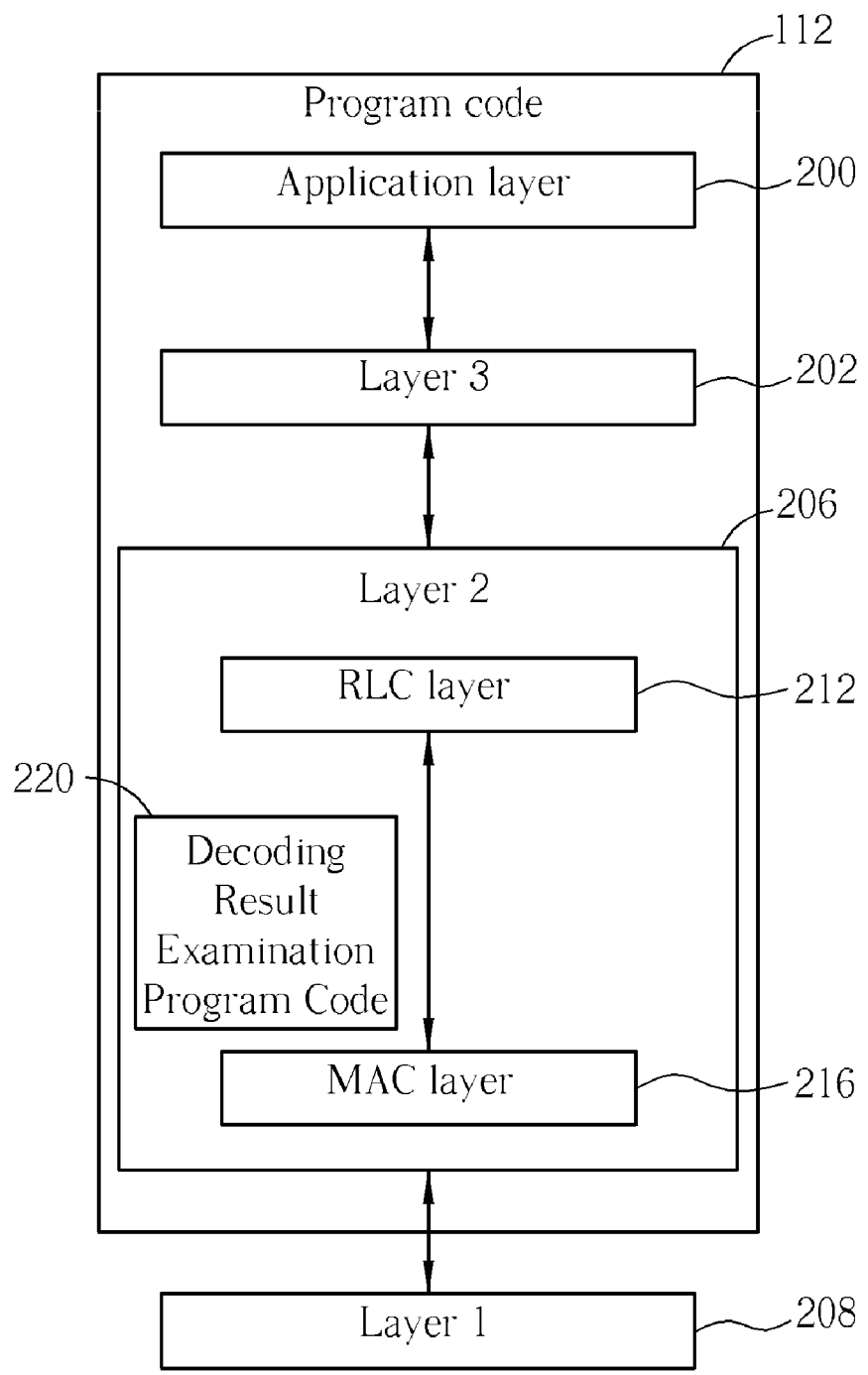
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 208. The Layer 3 202 is for performing radio resource control (RRC). The Layer 2 206 includes a radio control link (RLC) layer 212 and a media access control (MAC) layer 216 for performing link control, and the Layer 1 208 is a physical layer.

Figure 3:
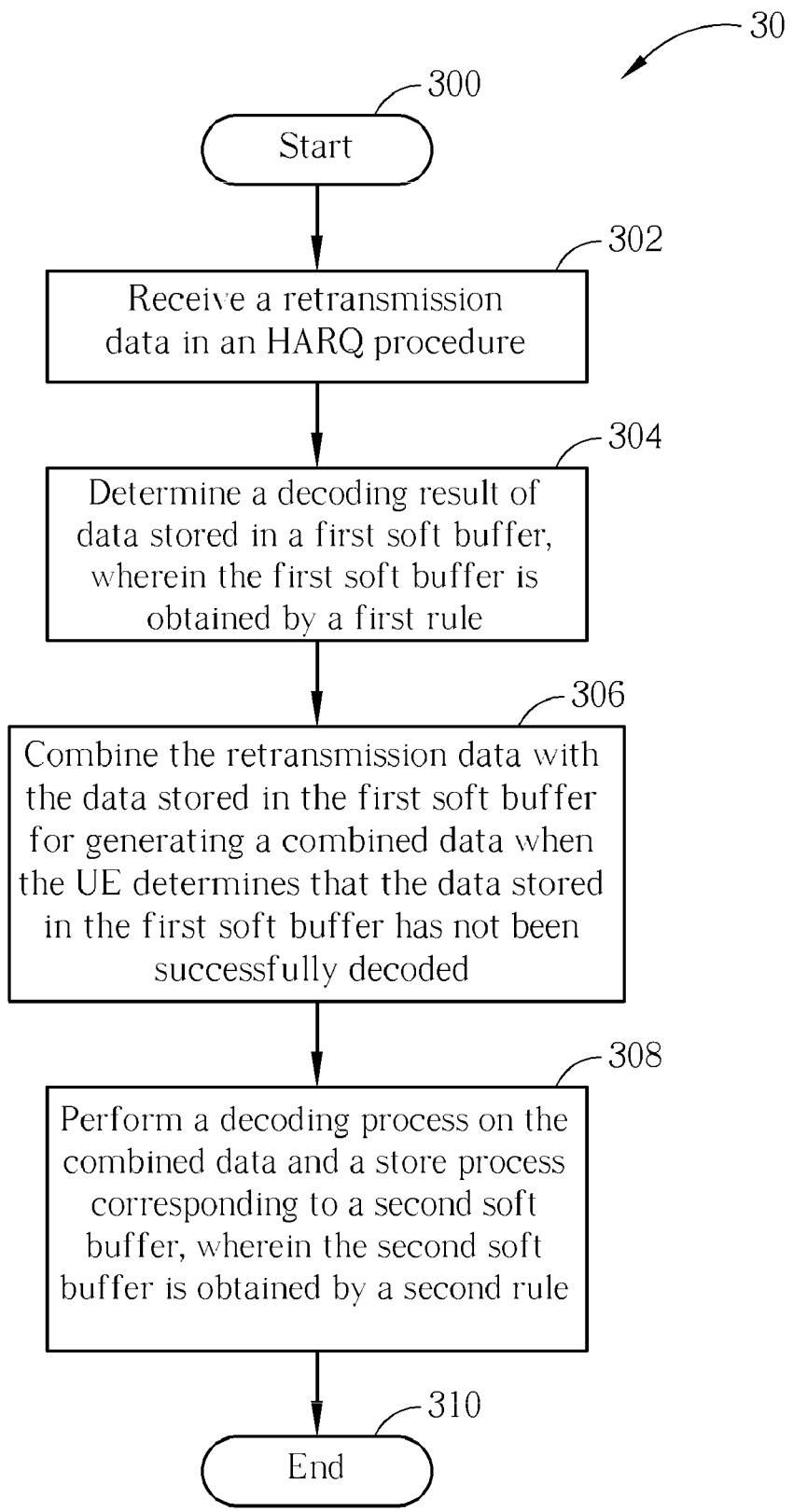
FIG. 3 is a flowchart of a process according to an embodiment of the present invention.

When the UE has sent an ACK but the Node-B does not receive the ACK or decodes the ACK as a NAK, the UE still has to perform an unnecessary data combination of a retransmission data and the data that has been decoded successfully, so that transmission efficiency of the HARQ operation is reduced. In this situation, an embodiment of the present invention provides a decoding result examination program code 220 for the program code 112 in the Layer 2 206 for improving the HARQ operation. Please refer to FIG. 3, which is a flowchart of a process 30 according to an embodiment of the present invention. The process 30 is utilized for improving the HARQ operation for a UE in the wireless communications system 400. The process 30 can be compiled into the decoding result examination program code 220. The process 30 includes the following steps:

Step 300: Start.

Step 302: Receive a retransmission data in an HARQ procedure.

Step 304: Determine a decoding result of data stored in a first soft buffer, wherein the first soft buffer is obtained by a first rule.

Step 306: Combine the retransmission data with the data stored in the first soft buffer for generating a combined data when the UE determines that the data stored in the first soft buffer has not been successfully decoded.

Step 308: Perform a decoding process on the combined data and a store process corresponding to a second soft buffer, wherein the second soft buffer is obtained by a second rule.

Step 310: End.

According to the process 30, the UE determines the decoding result of data stored in the first soft buffer first after receiving the retransmission data. When the UE determines that the data stored in the first soft buffer has not been successfully decoded, the UE combines the retransmission data with the data stored in the first soft buffer, for generating the combined data. After generating the combined data, the UE performs the decoding process on the combined data first, stores the combined data in the second soft buffer when the combined data is not successfully decoded, and then waits for a retransmission. On the other hand, the UE does not store the combined data in the second soft buffer when the combined data is successfully decoded. In addition, the UE can also store the combined data in the second soft buffer first, and then perform the decoding process.

Therefore, when the UE has sent an ACK but the Node-B does not receive the ACK or decodes the ACK as a NAK, the embodiment of the present invention determines the decoding result of the data stored in the first soft buffer first. When the UE determines that the data stored in the first soft buffer has not been successfully decoded, the UE combines the retransmission data with the data stored in the first soft buffer. As a result, the UE does not perform an unnecessary data combination, so as to enhance transmission efficiency of the HARQ operation for the UE in the HS-SCCH less operation.

In the process 30, the first soft buffer is used for storing the data of the previous transmission and is obtained by the first rule, which is selecting a soft buffer identified by a transmission time interval [5×CFN+SubFN−6−PTR] mod 13. On the other hand, the second soft buffer is used for storing the combined data that is generated by of the data of the previous transmission and the retransmission data, and is obtained by the second rule, which is selecting a soft buffer identified by a transmission time interval [5×CFN+SubFN] mod 13, wherein CFN is connection frame number, SubFN is subframe number, PTR is pointer to the previous transmission, and mod is modulo operation. In other words, the UE obtains the first soft buffer or the second soft buffer by a corresponding transmission time interval, so as to receive the data of the previous transmission stored in the first soft buffer, and store the combined data in the second soft buffer.

In the prior art, even if the UE decodes the data of the first transmission or the data of the second transmission successfully and reports a corresponding ACK, the Node-B may not receive the ACK or decodes the ACK as a NAK due to poor communication quality in the environment, and thereby starts a retransmission. On the other hand, the UE decodes the retransmission data after combining the retransmission data with the data stored in the soft buffer. In comparison, the embodiment of the present invention determines the decoding result of the data stored in the first soft buffer first after receiving the retransmission data, and then combines the retransmission data with the data stored in the first soft buffer when the UE determines that the data stored in the first soft buffer has not been successfully decoded. Therefore, the embodiment of the present invention does not perform an unnecessary data combination.

In conclusion, the embodiment of the present invention determines the decoding result of the data stored in a first soft buffer first, and then combines the retransmission data with the data stored in the first soft buffer when the UE determines that the data stored in the first soft buffer has not been successfully decoded. Therefore, the embodiment of the present invention does not perform an unnecessary data combination, so as to enhance transmission efficiency of the HARQ operation for the UE in the HS-SCCH less operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving Hybrid Automatic Repeat Request, abbreviated to HARQ, operation for a user equipment, called UE hereinafter, operating in HS-SCCH less operation in a wireless communications system, the method comprising:
   receiving a retransmission data in an HARQ procedure;
   determining a decoding result of data stored in a first soft buffer;
   combining the retransmission data with the data stored in the first soft buffer for generating a combined data when the UE determines that the data stored in the first soft buffer has not been successfully decoded; and
   performing a decoding process on the combined data and a store process corresponding to a second soft buffer;
   wherein the first soft buffer is obtained by a first rule that is based on a connection frame number and a subframe number, and the second soft buffer is obtained by a second rule that is based on the connection frame number and the subframe number.

2. The method of claim 1, wherein the step of performing the decoding process on the combined data and the store process corresponding to the second soft buffer comprises storing the combined data in the second soft buffer after the combined data is not successfully decoded.

3. The method of claim 1, wherein the step of performing the decoding process on the combined data and the store process corresponding to the second soft buffer comprises performing the decoding process on the combined data after storing the combined data in the second soft buffer.

4. The method of claim 1, wherein the first rule comprises selecting a soft buffer identified by a transmission time interval [5.times.CFN+SubFN−6−PTR] mod 13 as the first soft buffer from a plurality of soft buffers, wherein CFN is connection frame number, SubFN is subframe number, PTR is pointer to the previous transmission, and mod is modulo operation.

5. The method of claim 1, wherein the second rule comprises selecting a soft buffer identified by a transmission time interval [5.times.CFN+SubFN] mod 13 as the second soft buffer from a plurality of soft buffers, wherein CFN is connection frame number, SubFN is subframe number, and mod is modulo operation.

6. The method of claim 1, wherein the UE decodes the data of the first transmission according to predefined control information.

7. A communications device operating in HS-SCCH less operation of a wireless communications system for improving Hybrid Automatic Repeat Request, abbreviated to HARQ, operation, the communications device comprising:
   a control circuit for realizing functions of the communications device;
   a central processing unit installed in the control circuit for executing a program code to operate the control circuit; and
   a memory coupled to the central processing unit for storing the program code;
   wherein the program code comprises:
      receiving a retransmission data in an HARQ procedure;
      determining a decoding result of data stored in a first soft buffer;
      combining the retransmission data with the data stored in the first soft buffer for generating a combined data when the communications device determines that the data stored in the first soft buffer has not been successfully decoded; and performing a decoding process on the combined data and a store process corresponding to a second soft buffer;

wherein the first soft buffer is obtained by a first rule that is based on a connection frame number and a subframe number, and the second soft buffer is obtained by a second rule+ that is based on a connection frame number and a subframe number.

8. The communications device of claim 7, wherein the step of performing the decoding process on the combined data and the store process corresponding to the second soft buffer comprises storing the combined data in the second soft buffer after the combined data is not successfully decoded.

9. The communications device of claim 7, wherein the step of performing the decoding process on the combined data and the store process corresponding to the second soft buffer comprises performing the decoding process on the combined data after storing the combined data in the second soft buffer.

10. The communications device of claim 7, wherein the first rule comprises selecting a soft buffer identified by a transmission time interval [5.times.CFN+SubFN−6−PTR] mod 13 as the first soft buffer from a plurality of soft buffers, wherein CFN is connection frame number, SubFN is subframe number, PTR is pointer to the previous transmission, and mod is modulo operation.

11. The communications device of claim 7, wherein the second rule comprises selecting a soft buffer identified by a transmission time interval [5.times.CFN+SubFN] mod 13 as the second soft buffer from a plurality of soft buffers, wherein CFN is connection frame number, SubFN is subframe number, and mod is modulo operation.

12. The communications device of claim 7, wherein in the HS-SCCH less operation, a network terminal of the wireless communications system does not transmit required control signals to the communications device via the HS-SCCH in the first transmission, and the communications device decodes the data of the first transmission according to predefined control information.

* * * * *